United States Patent [19]

Ball et al.

[11] Patent Number: 4,900,777

[45] Date of Patent: Feb. 13, 1990

[54] PROCESS FOR THE MANUFACTURE OF AQUEOUS COPOLYMER DISPERSIONS AND THEIR USE

[75] Inventors: Peter Ball, Emmerting; Klaus Marquardt, Burghausen; Manfred Selig, Burghausen; Klaus Häfener, Burghausen, all of Fed. Rep. of Germany

[73] Assignee: Wacker-Chemie GmbH, Fed. Rep. of Germany

[21] Appl. No.: 202,225

[22] Filed: Jun. 3, 1988

Related U.S. Application Data

[63] Continuation of Ser. No. 600,354, Apr. 16, 1984, abandoned, which is a continuation of Ser. No. 423,275, Sep. 24, 1982, abandoned.

[30] Foreign Application Priority Data

Oct. 6, 1981 [DE] Fed. Rep. of Germany ....... 3139721

[51] Int. Cl.$^4$ ............................................. C08L 33/00
[52] U.S. Cl. ................................... 524/819; 526/213; 526/216; 526/193
[58] Field of Search ................ 524/819; 526/213, 216, 526/193

[56] References Cited

U.S. PATENT DOCUMENTS 3,324,097  1/1967  Pears .................................. 526/213

FOREIGN PATENT DOCUMENTS 1139789  1/1969  United Kingdom ................ 524/819

Primary Examiner—Joseph L. Schofer
Assistant Examiner—Alex H. Walker
Attorney, Agent, or Firm—Bierman and Muserlian

[57] ABSTRACT

Aqueous copolymer dispersions suitable for use in the manufacture of adhesives or as binding agents or as coating substances are produced by the emulsion polymerization of from 1 to 50% by weight of ethylene and from 99 to 50% by weight of vinyl monomers. With the process of the invention, in which, as vinyl monomers, vinyl chloride and, if desired, other ethylenically-unsaturated monomers, for example esters, are used, a higher ethylene content in the copolymer can be obtained at a lower pressure than hitherto. For this purpose, the greater part of the vinyl monomers is metered in and, in addition, an inert organic substance is used.

25 Claims, No Drawings

4,900,777

PROCESS FOR THE MANUFACTURE OF AQUEOUS COPOLYMER DISPERSIONS AND THEIR USE

PRIOR APPLICATION

This application is a continuation of U.S. patent application Ser. No. 600,354 filed Apr. 16, 1984 which is a continuation of copending U.S. patent application Ser. No. 423, 275 filed Sept. 24, 1982, both now abandoned.

Aqueous copolymer dispersions, especially dispersions of copolymers with a predominant content of vinyl chloride (VC) and ethylene (E) are very suitable for use as binding agents for paints, paper coatings or textile coatings, and also as melt adhesives. The copolymers contained therein, however, after the water has been separated off, can also be made into molded articles, for example piping, or insulation for electrical conductors.

Since VC and E as raw materials are less expensive than other ethylenically-unsaturated monomers, due to their simple manufacture or production on an industrial scale, the polymers consisting mainly of those substances are of particular importance in an age of rising rawmaterial prices.

The manufacture of emulsion polymers which consist predominantly of VC and E is, however, very difficult, since high pressures, and therefore very costly autoclave plants, are necessary for the incorporation of worthwhile amounts of ethylene into the polymer.

Thus, for example, German Offenlegungsschrift 15 70 921, corresponding to U.S. Pat. No. 3,403,137, incorporated herein by reference, describes a process for the manufacture of copolymers of ethylene and vinyl chloride in which pressures of over 1000 psi (=over 69 bar) are required in order to achieve a content of approximately 10% by weight of ethylene units in the copolymer. In order to polymerize 24% by weight of ethylene into the polymer, for example, a pressure of over 1000 bar is required (see Example 4). Even pressures of over 3447 bar are not excluded in that patent. The possibility of also using solvents such as benzene, chlorobenzene or tert.-butyl methyl ether is in fact mentioned, but their influence on the incorporation of ethylene is not described.

An improved process is described in German Offenlegungsschrift No. 21,39 041, corresponding to GB Pat. No. 1 339 182, incorporated herein by reference. According to that specification, pressures of from 34 to 207 bar are employed to obtain copolymers having from 6 to 30% of ethylene units. Thus in Example 7 of that application, a copolymer of 25.7% of E-units and 74.3% of VC-units is produced at a pressure of 138.3 bar. However, very long reaction times (approximately 12 to 16 hours) are always necessary for that purpose, so that the time/space yield achieved is only very modest in terms of polymerization processes. Furthermore, according to that specification, it is essential to carry out the copolymerization with a complete absence of reducing agents, and therefore to forgo the use of redox catalyst systems. However, the latter are frequently preferred because of the resulting lower reaction temperature and of the higher molecular weights that can often be achieved as a result.

An extreme variant of the process described in German Offenlegungsschrift No. 21 39 041 is proposed in published European patent specification No. 0 026 490 A, which describes a process of polymerization below the saturation pressure of the monomers. Since very slow polymerization rates result under those monomer-starved conditions, that process requires unusually large amounts of initiator in order to achieve economically acceptable polymerization times. High concentrations of initiator, however, must of necessity lead to low molecular weights, which are known to have a distinct adverse effect on many technical properties of the polymers affecting their use. Example 4 of the above specification makes the influence of the initiator on the molecular weight particularly clear.

OBJECTS OF THE INVENTION

An object of the present invention is to find a less expensive, faster, and therefore more economic process for the manufacture of copolymers in aqueous dispersion containing predominantly VC and E, without the disadvantages mentioned above.

Another object of the present invention is the development of an improvement in the process for the manufacture of fine-particle aqueous copolymer dispersions having a solids content of from 10% to 75% by weight, calculated on the dispersion, by means of the emulsion polymerization of (a) from 1% to 50% by weight of ethylene and (b) from 99% to 50% by weight of at least one vinyl monomer, by means of radical initiators and in the presence of emulsifiers and/or protective colloids and, optionally, further standard additives, the vinyl monomer phase comprising (b1) from 60% to 100% by weight of vinyl chloride (VC), (b2) from 0 to 40% by weight of oil-soluble mono-ethylenically-unsaturated monomers copolymerizable with ethylene and vinyl chloride, and (b3) from 0 to 10% by weight of monomers selected from the group consisting of mono-ethylenically-unsaturated monomers containing at least one functional group, multiple ethylenically-unsaturated monomers, and mixtures thereof, the improvement consisting essentially in that I the vinyl monomer phase (b) is present at the start in an amount of approximately 1% to 40% by weight, and II at least one inert organic substance having a water solubility of from $10^{-3}$ to 200 g/l and a molecular weight of not more than 1000, in an amount of from 0.1% to 15% by weight, calculated in each case on the total weight of component (b), is present at least partly at the start, III polymerization of the initial monomer phase is initiated by addition of at least one peroxide compound, IV the remainder of component (b) and, optionally, of the inert organic substance, is metered in during polymerization over a period of at least 2 hours, and V polymerization is carried out at temperatures of from 0° to 120° C., under an ethylene pressure of from 10 to 150 bar, which is built up at the latest by the moment when the initial monomer phase has polymerized.

These and other objects of the invention will become more apparent as the description thereof proceeds.

DESCRIPTION OF THE INVENTION

The above objects have been surprisingly well fulfilled by means of the process set forth in the claims. The copolymers contained in the dispersions thus produced surprisingly have a higher content of polymerized ethylene units than do copolymers hitherto produced at the same pressure, and also shorter polymerization times have been achieved.

The subject of the invention is a process for the manufacture of fine-particle aqueous copolymer dispersions having a solids content of from 10% to 75% by weight, calculated on the dispersion, by means of the emulsion polymerization of (a) from 1% to 50% by weight of ethylene and (b) from 99% to 50% by weight of at least one vinyl monomer, by means of radical initiators and in the presence of emulsifiers and/or protective colloids, the vinyl monomer phase comprising (b1) from 60% to 100% by weight of vinyl chloride, (b2) from 0 to 40% by weight of oil-soluble mono-ethylenically-unsaturated monomers copolymerizable with ethylene and vinyl chloride, and (b3) from 0 to 10% by weight of mono-ethylenically-unsaturated monomers containing at least one functional group and/or multiple ethylenically-unsaturated monomers, characterized in that I the vinyl monomer phase (b) is present at the start in an amount of from approximately 1% to 40% by weight, and II at least one inert organic substance having a water solubility of from $10^{-3}$ to 200 g/l and a molecular weight of not more than 1000, in an amount of from 0.1% to 15% by weight, in each case calculated on the total weight of component (b), is at least partly present at the start, III polymerization of the initial monomer phase is initiated by addition of at least one peroxide compound, IV the remainder of component (b) and, optionally, of the inert organic substance, is metered in during polymerization, and V polymerization is carried out at temperatures of from 0° to 120° C., under an ethylene pressure of from 10 to 150 bar, which is built up at the latest by the moment when the initial monomer phase has polymerized.

More particularly, the present invention relates to an improvement in the process for the manufacture of fine-particle aqueous copolymer dispersions having a solids content of from 10% to 75% by weight, calculated on the dispersion, by means of the emulsion polymerization of (a) from 1% to 50% by weight of ethylene and (b) from 99% to 50% by weight of at least one vinyl monomer, by means of radical initiators and in the presence of emulsifiers and/or protective colloids and, optionally, further standard additives, the vinyl monomer phase comprising (b1) from 60% to 100% by weight of vinyl chloride (VC), (b2) from 0 to 40% by weight of oil-soluble mono-ethylenically-unsaturated monomers copolymerizable with ethylene and vinyl chloride, and (b3) from 0 to 10% by weight of monomers selected from the group consisting of mono-ethylenically-unsaturated monomers containing at least one functional group, multiply ethylenically-unsaturated monomers, and mixtures thereof, the improvement consisting essentially in that I the vinyl monomer phase (b) is present at the start in an amount of approximately 1% to 40% by weight, and II at least one inert organic substance having a water solubility of from $10^{-3}$ to 200 g/l and a molecular weight of not more than 1000, in an amount of from 0.1% to 15% by weight, calculated in each case on the total weight of component (b), is present at least partly at the start, III polymerization of the initial monomer phase is initiated by addition of at least one peroxide compound, IV the remainder of component (b) and, optionally, of the inert organic substance, is metered in during polymerization over a period of at least 2 hours, and V polymerization is carried out at temperatures of from 0° to 120° C., under an ethylene pressure of from 10 to 150 bar, which is built up at the latest by the moment when the initial monomer phase has polymerized.

In the process of the invention, the vinyl monomers of component (b) are practically fully incorporated in the polymerizate, and also the ethylene content of the polymerizate is clearly increased in comparison with conventional polymerizates produced at the same pressure and temperature. In an analogous manner, with the manufacture according to the invention of aqueous dispersions containing copolymers of ethylene and vinyl monomers, especially predominantly VC, with an ethylene content of preferably at least 3% by weight, calculated on the polymerizate, the ethylene pressure can be reduced in comparison with the processes known hitherto. This becomes even clearer when manufacturing dispersions of such copolymers rich in ethylene, for example having at least 20% and especially at least 27% by weight of ethylene units. Thus, according to the invention, at pressures of up to 150 bar, preferably from 10 to 90 bar, especially from 30 to 80 bar, and in particular up to a maximum of 70 bar (but in each case above the saturation pressure of the vinyl monomers) at polymerization temperatures of from 0° to 120° C., preferably from 10° to 100° C., and especially from 40° to 80° C., even up to 50% by weight, preferably up to 40% by weight, and especially up to 35% by weight, of ethylene can be incorporated in the copolymer produced in the dispersion. Polymerization is generally concluded after approximately 10 hours. The end of polymerization can be determined more precisely by the noticeable reduction in the evolution of heat and in the pressure. This preferably occurs approximately 2 to 3, especially 1 to 2, hours after the end of the metering-in of the vinyl monomers. In preferred embodiments, the duration of polymerization is even shorter, i.e. polymerization is often already complete after 7 to 8 hours.

The addition of the vinyl monomers (b) is carried out in such a way that approximately 1% to 40% by weight, preferably 1% to 30% by weight, and especially with VC/E-copolymerization without component (b2), preferably 3% to 10% by weight, is introduced initially and the remainder is then metered in during polymerization, preferably at the rate at which it is consumed. It is especially preferred that the metered addition should commence only when the concentration of the vinyl monomers, calculated on the total dispersion, is only 25% by weight, preferably only 20% by weight, especially only 10% by weight, and most particularly only 5% by weight, and should be carried out in such a way that this limit is not thereafter exceeded. Furthermore, it is preferred that the vinyl monomer concentration during the metering-in should not drop below 1% by weight as the lower limit.

It is also possible, however, to introduce initially a seed latex which may, if desired, be produced in a previous polymerization step, and which, in the framework of the monomers mentioned, may have a different composition from that of the vinyl monomer being metered in. Such a seed latex may, for example, contain up to 50% by weight of ethylene units. The amount of the seed latex polymer is preferably counted towards the total amount of the monomers, especially of component (b).

The vinyl monomers may be added individually or as a mixture, as aqueous pre-emulsions if required. Basically, the composition of the vinyl monomers in the initial monomer phase may differ from that of the metered amounts added. It is also possible to present one vinyl monomer in full at the start and partly or completely to meter-in other vinyl monomers.

With the process of the invention, the ethylene may also be already partially or entirely present at the start, i.e. the intended ethylene pressure may be already built up before polymerization commences. But it may also be built up only during the course of polymerization, but not later than when the initial monomer phase has polymerized, and preferably not later than the commencement of the metered addition of the vinyl monomers. The ethylene pressure may be varied as required during polymerization, repeatedly if necessary, i.e. increased and/or decreased. However, it is preferably kept constant over the greater part of the time during which the metered addition of the vinyl monomers takes place. After that, it is preferable for no more ethylene to be fed in during the post-addition polymerization period.

As vinyl monomer (if desired, also of the seed latex), VC (vinyl chloride) is to be mentioned in particular; this makes up at least 60% by weight, preferably at least 65% by weight, and especially at least 75% by weight of component (b). As further mono-ethylenically-unsaturated vinyl monomers (if desired, also of the seed latex) which are oil-soluble and are copolymerizable with ethylene and VC, the following are to be mentioned: mono-ethylenically-unsaturated esters, such as allyl and, preferably, vinyl, esters of non-ethylenically-saturated, preferably saturated, straight-chain, branched or cyclic carboxylic acids, especially of ($C_1$ to $C_{20}$)-alkylcarboxylic acids, such as lower alkenyl $C_{1-20}$-alkanoates, for example vinyl acetate, vinyl propionate, vinyl butyrate, vinyl 2-ethylhexanoate, vinyl laurate, vinyl stearate, vinyl esters of highly branched carboxylic acids, which can be produced, for example, by so-called Koch synthesis from olefins and carbon monoxide (so-called Versatic (registered Trade Mark) acid vinyl esters); as well as monoalkyl and dialkyl esters of mono-ethylenically-unsaturated carboxylic acids, especially those of alkanols having from 1 to 18, preferably from 1 to 8, carbon atoms, with $\alpha,\beta$-unsaturated ($C_3$ to $C_8$)alkenoic acids, for example methyl esters of acrylic acid, methacrylic acid and crotonic acid, the ethyl, propyl, butyl, 2-ethylhexyl, lauryl and stearyl esters of such carboxylic acids, dialkyl esters of mono-ethylenically-unsaturated ($C_4$ to $C_{10}$)-alkendioic acids, for example the esters of the above-mentioned ($C_1$–$C_{18}$)-alkanols with maleic acid, fumaric acid and itaconic acid; as well as $\alpha$-olefins other than ethylene, for example propylene, butylene, styrene and vinyl toluene; as well as vinyl-lower alkyl ethers and vinyl lower-alkyl ketones; as well as other vinyl halides such as vinyl fluoride and vinyl bromide, and as well as vinylidene halides, for example vinylidene chloride.

The above-mentioned ethylenically-unsaturated esters, especially the vinyl esters, the acrylic acid, methacrylic acid, maleic acid and fumaric acid esters and the halogen derivatives of ethylene are preferred. The above-mentioned ethylenically-unsaturated esters are especially preferred.

These monomers, which cannot undergo further reactions, e.g. crosslinking and may be used individually or as a mixture, are contained in the vinyl component (b) in amounts of up to 40% by weight, preferably not more than 35% by weight, and especially from 0 to 25% by weight.

Furthermore, other monomers that can be polymerized with the monomers mentioned above may be contained in the vinyl component (b) in amounts of from 0 to 10% by weight. Such monomers are those which carry functional groups or are multiple ethylenically-unsaturated. The functional monomers are preferred. Among the latter are understood such compounds which, in addition to an ethylenic double bond, also have carboxyl (—COOH or —COO$^-$), sulfonate, epoxide or hydroxyl radicals, or amide radicals optionally substituted by, for example, alkyl, hydroxyalkyl, alkoxyalkyl, alkanoyl or alkanoylalkyl groups. The following are mentioned as examples: acrylic, methacrylic, itaconic, fumaric and maleic acid, their alkali metal or ammonium salts, their glycidyl esters, their monoamides or diamides, especially acrylamide and methacrylamide, which may be monosubstituted or disubstituted on the nitrogen atom by ($C_1$ to $C_4$)-alkyl groups and/or by the methylol group, which in turn may be etherified by an alkyl radical or esterified by an alkanoic acid, and monoesters of the above-mentioned dicarboxylic acids with the already mentioned ($C_1$ to $C_8$)-alkanols, as well as vinyl and allyl sulfonates.

The following may be mentioned as examples of multiple-ethylenically unsaturated monomers: vinyl and allyl esters of ($C_3$ to $C_8$)-alkenoic acids, and also monovinyl or divinyl and monoallyl or diallyl esters of saturated or unsaturated ($C_4$ to $C_{10}$)-dicarboxylic acids, triallyl cyanurate and diesters and polyesters of $\alpha,\beta$-unsaturated alkenoic acids with polyfunctional alcohols.

Such monomers of the group (b3), especially those which are readily soluble in water, such as the carboxylic acids, their salts and their amides, and most particularly the sulfonates, are often preferably used only in amounts of up to 2% by weight, since they are used to improve the stability of the dispersion. Monomers through which subsequent cross-linkage can be effected, for example N-methylol-(meth)acrylamide, are often preferably used in amounts of up to 5% by weight. The percentages by weight which are given are, in each case, based on the total weight of the vinyl monomer component (b).

Especially preferred as vinyl monomers are mixtures of vinyl acetate and/or butyl acrylate with vinyl chloride, and especially vinyl chloride to which monomers small amounts of acrylic acid and/or acrylamide may be added if desired in order to improve the stability of the dispersion.

The copolymers manufactured according to the invention preferably have K-values (according to DIN 53 726, measured in THF/H$_2$O 95:5) of from 20 to 100, especially 30 to 80, and particularly 35 to 70. The minimum film-forming temperatures are generally $\leq 20°$ C., often $\leq 0°$ C., depending on the ethylene content.

At least one inert organic substance is also used, and that has a water solubility of from $10^{-3}$ to 200 g/l, preferably from $10^{-2}$ to 10 g/l, and a molecular weight of not more than 1000, preferably of not more than 500. In addition, such inert organic substances which have a boiling point of at least 170° C. (at a pressure of one bar) are preferred.

The inert organic substances are used in amounts of from 0.1% to 15% by weight, calculated on the total weight of the vinyl monomers, preferably 0.5% to 10% by weight, and especially 1% to 5% by weight.

When larger amounts are used, dispersions with the advantageous properties which can be produced according to the invention can no longer be obtained.

The inert organic substance may be added to the reaction mixture either completely or partially before or at the start of polymerization, in fractions during polymerization, or may be metered in gradually. It is preferred, however, for the whole of the substance to be present at the start. The smaller the amount of vinyl monomer or seed latex presented, the smaller the amount of the inert organic substance presented is generally kept, so that the ratio of inert organic substance to the vinyl monomer or seed latex present is advantageously, for example, not more that 2:1, preferably not more than 1:1.

After polymerization the inert organic substance may, if desired, be removed again from the resulting copolymer dispersion by suitable distillation. In an especially preferred embodiment, however, inert organic substances are used which can remain in the polymer, for example as plasticizers.

In the context of this invention, the term "inert organic substance" means that the substance, on the one hand, does not itself react to any noticeable extent during polymerization, for example is not hydrolyzed, and, on the other hand, has little or no effect on the growth of the polymer chain.

Thus the transfer constant $C_S$ for the organic substances and monomers used should generally be less than 0.05, preferably not more than 0.01.

If, however, value is placed on a polymer of a low molecular weight for a special application, organic substances may be used which have a transfer constant exceeding that limit, or mixtures of inert organic substances and known chain transfer agents may be used. A definition and a list of transfer constants is to be found, for example in "Handbook of Polymer Science", J. Brandrup and E. H. Immergut (editors), 2nd edition, 1975, Wiley-Interscience, New York, N. Y., incorporated herein by reference.

No special requirements are made in the process of the invention regarding the dissolving power of the inert organic substance. Although true solvents are preferred for the polymer, compounds which only sell the polymer are also suitable. In extreme cases, mixtures of solvents and non-solvents may be used. In the context of the invention, the expressions "inert organic substance" and "solvent" also include plasticizers, for example, according to the definition in German Industrial Standard DIN 55 947 (as translated):

"Plasticizers are liquid or solid inert organic substances with a low vapor pressure, predominantly ester-like in nature. Without any chemical reaction, preferably by means of their dissolving or swelling capacity, but in certain circumstances also without such capacity, they can interact physically with high-polymer materials and form a homogeneous system with the latter."

Suitable inert organic substances that fulfill the above-mentioned conditions are known to a person skilled in the art; the list which follows is intended only by way of example and should not limit the choice of substances.

Inert organic substances which are suitable for the process of the invention insofar as they fulfill the above-mentioned conditions are, in particular:

1. Esters, partial esters and polyesters of monobasic or polybasic organic acids (1 to 20, preferably 2 to 8, carbon atoms/acid molecule) with monohydric or polyhydric alcohols (1 to 20, preferably 2 to 8, carbon atoms/alcohol molecule), in which the carbon chain, both in the acid radical and in the alcohol radical, can be interrupted by up to 3 oxygen atoms (ether bonds) or may be substituted by epoxy, (C$_1$ to C$_8$)alkoxy, phenoxy, and/or hydroxy groups.

Examples of suitable acids for the formation of such esters are: alkanoic acids having from 1 to 20 carbon atoms such as formic, acetic, propionic, butyric, valeric, caproic, caprylic, capric, ethylbutyric or ethylhexanoic acid, pelargonic acid and lauric acid; phenylcarboxylic acids such as benzoic acid, phthalic acid and trimellitic acids; alkanedioic acids having from 2 to 20 carbon atoms such as oxalic, malonic, succinic, glutaric, adipic or sebacic acids; cycloalkyl carboxylic acids such as hexahydrophthalic acid; hydroxyalkanoic acids such as glycolic or lactic acid; hydroxyalkanepolycarboxylic acids such as citric or tartaric acids; ricinoleic acid; and their alkoxy derivatives; epoxidized soybean fatty acid; and epoxystearic acid.

Examples of alcohols suitable for esterification with the above-mentioned acids are:

Alkanols having from 1 to 20 carbon atoms such as methanol, ethanol, propanols, butanols, pentanols, hexanols, heptanols or octanols; cycloalkanols such as cyclohexanol; benzyl alcohol; alkanediols having from 2 to 20 carbon atoms such as propanediol, butanediol and hexanediol; alkanepolyols such as trimethylolpropane, pentaerythritol or glycerol; ether alcohols such as diethylene glycol, triethylene glycol, methoxyethoxyethanol, ethoxyethoxyethanol, butoxyethoxyethanol, phenoxyethanol and glycidol.

Examples of especially preferred esters are:

Butoxyethoxyethyl acetate, diethylene glycol dibenzoate, triethylene glycol dibenzoate, triethylene glycol diethylbutyrate, dibutyl phthalate, diethylhexyl phthalate (dioctyl phthalate), dibutyl adipate, dioctyl adipate, di-methoxyethyl phthalate, butylphthalyl butylglycolate, methylphthalyl ethylglycolate, ethylphthalyl ethylglycolate, di-ethoxyethyl adipate, di-butoxyethyl adipate, di-butoxyethyl phthalate, oligoesters or triethylene glycol and adipic acid, 2,2,4-trimethylpentanediol-1,3 monoisobutyrate, butyl benzyl phthalate, and butyl-cresyl phthalate.

2. Esters of phosphoric acid with phenols, which may be substituted if desired, and/or with monohydric alcohols (1 to 20, preferably 2 to 8, carbon atoms/alcohol molecule), in which the carbon chain may be interrupted by up to 3 oxygen atoms or substituted by (C$_1$ to C$_8$)alkoxy or phenoxy groups or chlorine atoms.

Examples of suitable and preferred esters are: Trioctyl phosphate, trichloroethyl phosphate, tributyl phosphate, tri-butoxyethyl phosphate, cresyl diphenyl phosphate and triphenyl phosphate.

3. Alcohols having from 4 to 20 carbon atoms/molecule, in which the carbon chain may also be interrupted by from 1 to 3 oxygen atoms or substituted by ($C_1$ to $C_8$)-alkoxy groups or phenoxy groups.

Examples of suitable alcohols are:

Ethylhexanol, cyclohexanol, methylcyclohexanol, benzyl alcohol and monophenyl ethylene glycol.

4. Ketones having from 5 to 20 atoms/molecule, for example, methyl isobutyl ketone, cyclohexanone, and isophorone.

5. Ethers and acetals having from 4 to 20 carbon atoms per molecule, in which the carbon chain may be interrupted by from 1 to 3 oxygen atoms, or substituted by ($C_1$ to $C_8$)-alkoxy groups or phenoxy groups.

Examples of suitable ethers are:

Dibutyl ether, dibenzyl ether or dibutoxyethoxyethylformal. Diphenoxyethylformal is, for example, especially preferred.

6. Chlorohydrocarbons and fluorohydrocarbons having from 1 to 20 carbon atoms per molecule, in which the carbon atoms in each case may be substituted by a maximum of 2 chlorine atoms, for example, methylene chloride, dichloroethane, 1,1,2-trichloro-1,2,2-trifluoroethane, chlorobenzene, chlorodiphenyl; of this group, methylene chloride is, for example, preferred.

7. Aromatic hydrocarbons having from 6 to 20 carbon atoms per molecule, for example;

Benzene, toluene, xylenes; toluene is, for example, preferred.

8. Organic sulfonic acid amides, especially aromatic hydrocarbon sulfonic acid amides, for example:

Toluenesulfonic acid ethylamide, benzenesulfonic acid methylamide, toluenesulfonic acid cyclohexylamide, toluenesulfonic acid di-tert.-butylamide.

9. Esters of organic sulfonic acids having from 4 to 20 carbon atoms with monohydric alcohols having from 4 to 20 carbon atoms, for example:

Dodecanesulfonic acid phenyl ester, anisol-4-sulfonic acid cresyl ester, diphenylether-4-sulfonic acid xylenyl ester.

10. Sulfones, for example:

Sulfonyl-bis-(phenoxyethyl acetate).

Compounds of the groups 1, 2, 5, 9, 6 and 7 listed above (in descending order of preference) are preferably used. Mixtures of different compounds may, of course, also be used.

Surprisingly, even when the entire amount of the organic substances is presented at the start, a very fine-particle, stable dispersion is obtained which is extensively free of coarse elements and has a solids content of from 10% to 75%, preferably 30% to 70%, and in particular 40% to 60% by weight, calculated on the total weight.

The process claimed is carried out as an emulsion polymerization. For emulsion polymerization, all the usual auxiliary substances such as emulsifiers, protective colloids, initiators, reducing agents and regulators can be used in the usual amounts, and here again it is possible to add them in a batch at the start, to add them by fractions, or to use more or less continuous metered addition as desired.

Polymerization is initiated by the methods customarily used for emulsion polymerization. Especially suitable are inorganic or organic peroxide compounds which are at least partially water-soluble, and preferably fully water-soluble, for example, peroxo-compounds and hydroperoxides, also water-soluble azo compounds. The following may be mentioned: alkali metal and ammonium peroxosulfates, peroxodisulfates and peroxophosphates, hydrogen peroxide, tert.-butylhydroperoxide, and azobiscyanovaleric acid.

If desired, the above-mentioned peroxide initiators may also be combined with reducing agents in known manner. For example, alkali metal formaldehydesulfoxylates (Brüggolith, Rongalit (registered Trade Marks), alkali metal bisulfites, sulfites and thiosulfites, and ascorbic acid are suitable.

Redox systems of this type are preferred. The known addition of small amounts of heavy metal compounds, e.g. of iron (II) salts, is then often appropriate.

The pH range desired for polymerization, which is generally between 2.5 and 10, especially between 3 and 8, may be kept constant in a manner known per se by means of suitable buffer systems, for example, phosphate or carbonate buffers.

The emulsifiers and protective colloids suitable for the process of the invention are known to a person skilled in the art.

In principle, almost all surface-active substances are suitable for use in the emulsion polymerization. In specific cases, the choice is dictated by technical requirements of the application for which the product is intended, by the monomers used, and by the reaction conditions. The amounts used are between 0 and 10% by weight, preferably between 1% and 5% by weight, calculated in each case on the vinyl monomers.

Both anionic and cationic, as well as non-ionic and amphoteric, tensides can be used in principle for emulsion polymerization according to the process of the invention. Anionic and non-ionic emulsifiers are preferred.

A list of emulsifiers suitable for the process of the invention classified according to their chemical nature is to be found, for example, in Stache, "TensidTaschenbuch" (Tenside Hand-book), from p. 159, Munich, 1979.

As anionic tensides suitable for emulsion polymerization according to the process of the invention, the following are preferred:

1. Alkyl sulfates, especially those having a chain length of from 8 to 18 carbon atoms, alkyl ether sulfates and alkylaryl ether sulfates having from 8 to 18 carbon atoms in the hydrophobic radical and from 1 to 40 ethylene oxide or propylene oxide units.

2. Sulfonates, especially alkyl sulfonates having from 8 to 18 carbon atoms, alkylaryl sulfonates having from 8 to 18 carbon atoms, taurides, esters and semi-esters of sulfosuccinic acid with monohydric alcohols or alkylphenols having from 4 to 15 carbon atoms. If desired, these alcohols or alkyl phenols may also be ethoxylated with from 1 to 40 ethylene oxide (EO)-units.

3. Alkali metal and ammonium salts of carboxylic acids having from 8 to 20 carbon atoms in the alkyl, aryl, alkaryl, or aralkyl, radical.

4. Partial esters of phosphoric acid and their alkali metal and ammonium salts, especially alkyl phosphates or alkylaryl phosphates having from 8 to 20 carbon atoms in the organic radical, alkyl ether phosphates or alkylaryl ether phosphates having from 8 to 20 carbon atoms in the alkyl or alkylaryl radical and from 1 to 40 EO-units.

The following are suitable as non-ionic tensides:

5. Alkyl polyglycol ethers, preferably having from 8 to 40 EO-units and alkyl radicals of from 8 to 20 carbon atoms.

6. Alkylaryl polyglycol ethers, preferably having from 8 to 40 EO-units and from 8 to 20 carbon atoms in the alkyl and aryl radicals.

7. Ethylene oxide/propylene oxide (EO/PO) block copolymers, preferably with from 8 to 40 EO and PO-units.

Furthermore, all compounds that can be used as protective colloids in emulsion polymerization are suitable for use according to the process of the invention, preferably in amounts of from 0 to 15 percent based on the weight of the vinyl monomers. The following are preferred:

1. Vinyl alcohol/vinyl acetate copolymers produced by saponification, having a content of from 80 to 100, especially preferably from 86 to 90 mol % of vinyl alcohol units and a viscosimetrically determined molecular weight of from 15,000 to 100,000.

2. Cellulose derivatives, especially hydroxyethylcelluloses having a molecular weight of 50,000 to $10^6$ and a substitution degree of from 1.5 to 3.

3. Polyvinyl pyrrolidones having a molecular weight of from 5,000 to 400,000.

4. Starches.

It is also possible to use different types of emulsifier during different stages of the reaction. Thus, particularly when using the seed latex process, the emulsifier system used during the production of the seed latex may differ basically from that used for the actual polymerization, provided that the effects of the different emulsifiers are not cancelled out, for example, by reaction with one another.

The polymer dispersions or polymers produced according to the invention and containing predominantly vinyl chloride and ethylene (VC and E) may be used for all applications for which the known VC/E-copolymers are suitable. Thus, the dispersions produced according to the invention may be used to particular advantage for the manufacture of adhesives for wood, paper, plastics, films or leather, as binding agents for textiles or in paints, or for coating paper.

The polymer obtained from the dispersion by separating out the water can be formed into molded articles when it has been melted, or can be used for the manufacture of varnishes or adhesives after being dissolved in a suitable solvent.

EXAMPLES

The invention is explained by means of the following examples and comparison tests. Unless otherwise stated, all percentages are percentages by weight. These examples are not to be deemed limitative of the invention in any respect.

EXAMPLE 1

A solution of 8 g of a sodium alkyl sulfonate (alkyl radical having about 15 carbon atoms), 5.4 g of sodium vinyl sulfonate, 18 g of a tridecyl polyglycol ether (about 15 ethylene oxide units) and also 5.4 g of acrylamide and 11 g of acrylic acid, adjusted to a pH of 3.5, were placed in a 16-liter autoclave.

The vessel was evacuated, flushed with nitrogen, and, after being evacuated again, heated to 50° C. After 270 g of dioctyl phthalate and 270 g of VC had been added and emulsified, the emulsion was saturated with ethylene at a pressure of 70 bar.

Polymerization was initiated by adding 150 ml per hour of a solution of 60 g of ammonium peroxodisulfate in 1 liter of water as well as 150 ml per hour of a solution of 30 g of Rongalit (registered Trade Mark) in 1 liter of water.

15 minutes after polymerization had commenced, 5420 g of VC and a solution of 158 g of the tridecyl polyglycol ether, 8 g of acrylamide and 16 g of acrylic acid in 900 g of water were metered in over a period of 8 hours.

After the introduction of the VC dosing and of the emulsifier/comonomer dosing, the rate at which the solutions of the initiator components were fed in was reduced to 60 to 90 ml per hour, so that at the end of the metered addition of VC, the initiator solutions could be metered in for a further 1 to 2 hours.

The ethylene pressure was kept constant during the metering-in of the VC. No more ethylene was fed in afterwards.

A total of 2300 g of ethylene were added. The pH was maintained at between 3.5 and 4.5 during the reaction by adding $NH_3$.

After completion of the metered addition of initiator, the mixture was freed of the remaining vinyl chloride and ethylene by being released from pressure and evacuated for one hour.

A dispersion having a solids content of 52% was obtained.

Minimum film-forming temperature: 3° C.

Ethylene content of the polymer: 23.9%.

Viscosity (Epprecht Rheometer STV/III A at 20° C.): 34 mPas.

K-value according to Fikentscher (DIN 53 726, measured in THF/water 95:5): 40.

EXAMPLE 2

Example 1 was repeated with the following changes:

1. Instead of 270 g of dioctyl phthalate, 130 g of toluene were used.

2. Heating was carried out to a temperature of 30° C.

3. Instead of 270 g of vinyl chloride, a mixture of 150 g of VC and 45 g of vinyl acetate (VAC) was emulsified before commencement of polymerization.

4. The emulsion was saturated with ethylene at a pressure of 60 bar, and after polymerization of the initial batch, a monomer mixture of 4850 g of VC and 1455 g of VAC was metered in.

5. No more ethylene was fed in under pressure during polymerization.

A dispersion having a solids content of 49.6%, a minimum film-forming temperature of 11° C., and a viscosity (measured as in Example 1) of 29 mPas was obtained. The K-value of the polymer was 47, and the ethylene content of the polymer was 17%.

Toluene content of the dispersion: 0.6%.

EXAMPLE 3

Example 1 was repeated with the following changes:

1. Instead of 270 g of dioctyl phthalate, 260 g of methylene chloride were used.

2. Heating was carried out to a temperature of 30° C.

3. Instead of 270 g of vinyl chloride, a mixture of 750 g of VC and 225 g of VAC was emulsified before commencement of the polymerization.

4. The emulsion was saturated with ethylene at a pressure of 50 bar, and after polymerization of the initial batch, a mixture of 4250 g of VC and 1275 g of VAC was metered in.

5. No more ethylene was fed in under pressure during polymerization.

A dispersion having a solids content of 50.1%, a minimum film-forming temperature of 9° C. and a viscosity (measured as in Example 1) of 17 mPas was obtained. The K-value of the polymer was 55.7, and the ethylene content was 19%. The methylene chloride content was only 0.02%.

EXAMPLE 4

Polymerization was carried out in the same manner as in Example 1, but the ammonium persulfate solution was added all at once with the initial polymerization batch. A total of 2,300 g of ethylene were added. A dispersion having a solids content of 50% was obtained. Minimum film-forming temperature: 1° C. Ethylene content of the polymer: 25.4%. Viscosity (measured as in Example 1): 27 mPas. K-value (constantly measured as in Example 1): 39.

EXAMPLE 5

5710 g of a polybutyl acrylate dispersion having a solids content of 5.6% and a particle size of 0.06 μm, 500 ml of water and 120 g of butoxyethoxyethyl acetate were placed in a 16-liter autoclave, evacuated, adjusted to pH 4, and heated to 50° C. After the addition of 15 ml of a 1% solution of ferroammonium sulfate, the stirrer was started at 100 rev/min and the initial batch was saturated with ethylene at a pressure of 70 bar. The following were then metered in simultaneously:
1. 60 g of ammonium persulfate dissolved in 700 ml of water, at a rate of 90 ml per hour.
2. 30 g of Rongalit (registered Trade Mark) dissolved in 700 ml of water, at a rate of 30 ml per hour. 3. 5680 g of VC, at a rate of 800 g per hour. 4. 270 g of nonylphenol polyglycol ether sulfate with about 25 ethylene oxide units, dissolved in 500 ml of water, at a rate of 100 ml per hour. The ethylene pressure was maintained at 70 bar.

One hour after the completion of all metered additions, the ethylene pressure was released and the resulting dispersion was stirred for 20 minutes under vacuum.

The product had the following characteristics:
Polymer composition: 70% by weight of VC-units, 26% by weight of ethylene units, and 4% by weight of butyl acrylate units.
Minimum film-forming temperature: 6° C.
Viscosity (Brookfield viscosimeter, 20 min$^{-1}$, 20° C.): 41 mPas.
Residue after screening through a screen having a mesh size of 60 μm: 11 mg/kg of dispersion.
Particle size (electron microscope): 0.14 μm.
Solids content: 46%.
The polymer after separation from the dispersion had a tensile strength of 1.98 N/mm$^2$ and an elongation at break of 1200%.

EXAMPLE 6

Example 5 was repeated with the following changes:
5835 g of a polybutyl acrylate dispersion having a solids content of 5.5% and a particle size of 0.1 μm, 72 g of sodium dicyclohexyl sulfosuccinate, 180 g of diphenoxyethylformal, and 150 mg of ferroammonium sulfate at a pH of 4 were used as the initial batch of ingredients. The metered addition 3 was replaced by a mixture of 5400 g of VC and 600 g of butyl acrylate (BA), and the metered addition 4 was replaced by a mixture of 625 g of N-methylol acrylamide solution (48%), 60 g of acrylic acid, and 70 ml of 5% sodium hydroxide solution. The metered addition 4 was made at a rate of 115 ml per hour.

The resulting dispersion had a solids content of 45.4%, a viscosity (Brookfield 20 min$^{-1}$, 20° C.) of 65 mPas, and a minimum film-forming temperature of 11° C. The particle size was 0.24 μm.
Ethylene content: 24%.

EXAMPLE 7

Example 5 was repeated with the following changes:
Instead of 120 g of butoxyethoxyethyl acetate, 120 g of trichloroethyl phosphate were used, and the ethylene pressure was reduced to 50 bar.

A dispersion having a solids content of 46%, a minimum film-forming temperature of 22° C. and an ethylene content in the polymer of 20% was obtained. The viscosity (Brookfield 20 min$^{-1}$, 20° C.) was 27 mPas.

EXAMPLE 8

Example 7 was repeated, but instead of trichloroethyl phosphate, trioctyl phosphate was used. A dispersion was obtained having characteristics corresponding to those in Example 7.

EXAMPLE 9

Example 7 was repeated, but instead of trichloroethyl phosphate, 120 g of butoxyethoxyethyl acetate were used. The resulting dispersion had a solids content of 51.4% and a minimum film-forming temperature of 16° C. The ethylene content of the polymer was 22%; the viscosity was 33 mPas (Brookfield 20 min$^{-1}$, 20° C.).

COMPARISON TEST A

Example 9 was repeated without the use of an inert organic substance.
The product had the following characteristics:
Solids content of the dispersion: 48.2%.
Ethylene content of the polymer: 15%.
Minimum film-forming temperature: 30° C.
The amount of butoxyethoxyethyl acetate present during polymerization in Example 9 was added proportionately to the dispersion afterwards. This measure lowered the minimum film-forming temperature only to 22.5° C.

EXAMPLE 10

4900 g of a polybutyl acrylate dispersion having a solids content of 6.9% and a particle size of 0.056 μm, 60 g of sodium dicyclohexyl sulfosuccinate, 15 ml of a 1% solution of ferroammonium sulfate, and 120 g of Rheoplex 430 (registered Trade Mark) (polyester plasticizer by Ciba Geigy AG, Marienberg) at pH 4.2 were placed in a 16-liter autoclave, evacuated, and heated to 50° C. After the stirrer had been started at 100 rev/min, the contents were saturated with ethylene at a pressure of 50 bar. The following were then metered in simultaneously:
1. 60 g of ammonium persulfate dissolved in 700 ml of water, at a rate of 90 ml per hour.
2. 30 g of Rongalit (registered Trade Mark) dissolved in 700 ml of water, at a rate of 90 ml per hour.
3. 5680 g of VC, at a rate of 800 ml per hour.
4. A solution of 60 g of dicyclohexyl sulfosuccinate, 60 g of acrylamide, and 60 g of acrylic acid in 1220 ml of water, at a rate of 200 ml per hour.

The ethylene pressure was maintained at 50 bar. One hour after completion of all metered additions, the product was neutralized to pH 7, and stirred for 1 hour under vacuum after the ethylene pressure had been released.

The resulting dispersion had a solids content of 50.1%, a viscosity (Brookfield 20 min$^{-1}$, 20° C.) of 33 mPas, and a minimum film-forming temperature of 23° C. Ethylene content of the polymer: 17%.

EXAMPLE 11

Example 10 was repeated with the following changes:

1. Instead of 120 g of Rheoplex 430 (registered Trade Mark), 120 g of diphenoxyethyl formal were used.
2. Instead of 5680 g of VC, a mixture of 1700 g of VAC and 3980 g of VC were metered in. The minimum film-forming temperature of the dispersion was 17° C.

Ethylene content of the polymer: 17%.

EXAMPLE 12

2300 g of water, 280 g of butoxyethoxyethyl acetate, 50 mg of ferroammonium sulfate, 880 g of an 11% solution of Polyviol (registered Trade Mark) M 13/140 (partially saponified polyvinyl acetate having a Hoeppler viscosity of 13 mPas, measured at 20° C. in a 4% aqueous solution, and a saponification number of 140), and 1850 g of a 20% solution of Polyviol (registered Trade Mark) M 05/140 (Hoeppler viscosity 5 mPas, saponification number 140; Polyviols are polyvinyl alcohols from Wacker-Chemie GmbH, Munich) were mixed in a 16-liter autoclave, adjusted to pH 4, evacuated, and heated to 45° C. 850 g of VC and 1100 g of VAC were than added and emulsified, and 1200 g of ethylene were fed in under pressure (42 bar).

Polymerization was initiated by the metered addition of a 6% ammonium persulfate solution and a 3% Rongalit ® solution, each at a rate of 60 ml per hour. After a polymer solids content of 15% had been reached, 3700 g of VC were metered in at a rate of 620 g per hour. The ethylene pressure dropped during polymerization to 20 bar. 2 hours after completion of the vinyl chloride dosing, the metered addition of the initiator was stopped, the pH was adjusted to 8, the pressure was released and the product was stirred for 1 hour under vacuum. A dispersion was obtained, having a solids content of 54% and a polymer composition of 68% of vinyl chloride, 17% of vinyl acetate and 14% of ethylene, the minimum film-forming temperature being 3° C.

With a comparison batch without butoxyethoxyethyl acetate, in order to feed in 1200 g of ethylene under pressure, it was necessary to use a pressure of 48 bar, which rose to 60 bar during polymerization. The resulting copolymer contained 11% of ethylene units. After the amount of butoxyethoxyethyl acetate present during polymerization in Example 12 had been worked in, the minimum film-forming temperature dropped only to 8° C.

EXAMPLE 13

Example 1 was repeated with the following changes:
1. In the initial batch of ingredients the amount of acrylamide was increased to 20 g,
   acrylic acid to 40 g,
   Na-vinyl sulfonate to 30 g, and, instead of 270 g of dioctyl phthalate, 160 g of dioctyl adipate were used.
2. Acrylic acid and acrylamide were not metered in.
3. The period during which the monomer was metered in was reduced from 8 to 7 hours.
4. After 80% of the monomer had been metered in, the ethylene pressure was no longer kept constant by topping off.

A dispersion was obtained having the following characteristics:

| Solids content | 51% |
|---|---|
| Minimum film-forming temperature | 3° C. |
| Viscosity (measured as in Example 1) | 149 mPas |
| K—value | 44 |
| Ethylene content of polymer | 25% |

EXAMPLE 14

5560 g of water, 72 g of acrylic acid, 36 g of acrylamide, 27.5 g of Na-vinyl sulfonate, 7.2 g of a standard commercial Na-alkyl sulfonate ($C_{15}$-section) and 50.4 g of a standard commercial isotridecanol polyglycol ether (15 ethylene oxide units) were placed in a 16-liter autoclave.

The mixture was heated to 70° C., 1000 g of vinyl chloride, 25 g of butyl acrylate and 144 g of dioctyl adipate were added and emulsified, and the emulsion was saturated with ethylene at a pressure of 70 bar.

The reaction was initiated by rapidly pumping in 20 g of ammonium persulfate dissolved in 200 g of water. 4150 g of vinyl chloride, a solution of 144 g of the isotridecanol polyglycol ether in 480 g of water, and a solution of 20 g of ammonium persulfate in 300 g of water were then metered in simultaneously over a period of 4 hours.

The mixture was then allowed to continue reacting for 2 hours at 70° C.

A dispersion was obtained having the following characteristics:

| Solids content | 51% |
|---|---|
| Minimum film-forming temperature | 14° C. |
| Viscosity (measured as in Example 1) | 36 mPas |
| K—value | 70 |
| Ethylene content in polymer | 18% |

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. In the process for the manufacture of fine-particle aqueous copolymer dispersions having a solids content of from 10% to 75% by weight, calculated on the dispersions, by means of the emulsion polymerization of
   (a) from 1% to 50% by weight of ethylene and
   (b) from 99% to 50% by weight of at least one vinyl monomer by means of radical initiators and in the presence of emulsifiers and/or protective colloids and, optionally further standard additives, the vinyl monomer phase comprising
   (b1) from 60% to 100% by weight of vinyl chloride (VC),
   (b2) from 0 to 40% by weight of oil-soluble mono-ethylenically-unsaturated monomers copolymerizable with ethylene and vinyl chloride, and
   (b3) from 0 to 10% by weight of monomers selected from the group consisting of mono-ethylenically-unsaturated monomers containing at least one functional group, multiple ethylenically-unsaturated monomers, and mixtures thereof, the improvement consisting essentially in that I the vinyl monomer phase (b) is present at the start in an amount of approximately 1% to 40% by weight, and II at least one inert organic substance having a water solubility of from $10^{-3}$ to 200 g/l and a molecular weight of not more than 1000, in an amount of from 0.1% to 15% by weight, calculated in each case on the total weight of component (b), is present at least partly at the start, the said organic substance being selected from the group consisting of (A) esters, partial esters and polyesters of monobasic and polybasic organic carboxylic acids of 1 to 20 carbon atoms and mono-and polyhydric alcohols of 1 to 20 carbon atoms optionally interrupted by up to 3 oxygen atoms and optionally substituted with epoxy, —OH, alkoxy of 1 to 8 carbon atoms and/or phenoxy, (B) esters of phosphoric acid with at least one member of the group of the group consisting of phenols and monohydric alcohols of 1 to 20 carbon atoms optionally interrupted with up to 3 oxygen atoms and both optionally substituted with alkoxy of 1 to 8 carbon atoms, phenoxy or chlorine, (C) ketones of 5 to 20 carbon atoms, (D) chlorohydrocarbons and fluorohydrocarbons of 1 to 20 carbon atoms with no carbon atoms substituted with more that two chlorines, (E) aromatic hydrocarbons of 6 to 20 carbon atoms, (F) esters of organic sulfonic acids of 4 to 20 carbon atoms with monohydric alcohols of 4 to 20 carbon atoms and mixtures thereof, III polymerization of the initial monomers phase is initiated by addition of at least one peroxide compound, IV the remainder of component (b) and optionally, of the inert organic substance, is metered in during polymerization over a period of at least 2 hours, and V polymerization is carried out at temperatures of from 0° to 120° C. under an ethylene pressure of from 10 to 150 bar, which is built up at the latest by the moment when the initial monomer phase has polymerized.

2. The process of claim 1 wherein said component (b2) is selected from the group consisting of ethylenically-unsaturated esters of non-ethylenically-unsaturated straightchain, branched or cyclic carboxylic acids, alkyl esters of ethylenically-unsaturated carboxylic acids, halogen derivatives of ethylene and mixtures thereof, and said component (b3) is selected from the group consisting of ethylenically-unsaturated monomers which also have a functional group selected from the group consisting of a carboxyl group, an unsubstituted or substituted amide group, a sulfonate group, an epoxide group and a hydroxy group, and multiple ethylenically-unsaturated monomers.

3. The process of claim 1, wherein said vinyl monomers, besides vinyl chloride, are selected from the group consisting of the vinyl esters of ($C_1$ to $C_{20}$)alkylcarboxylic acids, ($C_1$ to $C_{18}$)-alkyl esters with $\alpha, \beta$-unsaturated ($C_3$ to $C_8$)-alkylmonocarboxylic acids, di-($C_1$ to $C_{18}$)-alkyl esters of ethylenically-unsaturated ($C_4$ to $C_{10}$)-alkylenedicarboxylic acids, vinyl halides, vinylidene halides, and mixtures thereof.

4. The process of claim 1 wherein seed latex produced in a preceding stage is present at the start before said polymerization initiation as at least part of said vinyl monomer phase (b) present at said start.

5. The process of claim 3 wherein seed latex produced in a preceding stage is present at the start before said polymerization initiation as at least part of said vinyl monomer phase (b) present at said start.

6. The process of claim 1 wherein the whole of said inert organic substance is present at the start before said polymerization initiation.

7. The process of claim 4 wherein the whole of said inert organic substance is present at the start before said polymerization initiation.

8. The process of claim 1 wherein the ethylene pressure is kept constant until the metering-in of the vinyl monomers has been completed.

9. The process of claim 4 wherein the ethylene pressure is kept constant until the metering-in of the vinyl monomers has been completed.

10. The process of claim 6 wherein the ethylene pressure is kept constant until the metering-in of the vinyl monomers has been completed.

11. The process of claim 1 wherein the metering-in of the vinyl monomers is begun when the vinyl monomer content of the dispersion does not exceed 25% by weight, and is carried out in such a way that that limit is not thereafter exceeded.

12. The process of claim 8 wherein the meteringin of the vinyl monomers is begun when the vinyl monomer content of the dispersion does not exceed 25% by weight, and is carried out in such a way that that limit is not thereafter exceeded.

13. The process of claim 11 wherein the vinyl monomer content of the dispersion does not exceed 5% and does not drop below 1% by weight during the metering-in period of step IV.

14. The process of claim 12 wherein the vinyl monomer content of the dispersion does not exceed 5% and does not drop below 1% by weight during the metering-in period of step IV.

15. The process of claim 1 wherein the monomer phase (b) present at the start is in an amount of from 1% to 30% by weight of the total monomer phase (b).

16. The process of claim 1 wherein the monomer phase (b) present at the start is in an amount of from 3% to 10% by weight of the total monomer phase (b).

17. The process of claim 1 wherein said inert organic substances have a boiling point of at least 170° C.

18. The process of claim 1 wherein the ratio of inert organic substance to the vinyl monomer phase (b) at the start is not more than 2:1.

19. The process of claim 1 wherein the transfer constant for said inert organic substances and said monomer components (a) and (b) is not more than 0.01.

20. The process of claim 1 or 2 wherein the pH for said polymerization is selected at a range between 3 and 8.

21. The fine-particle aqueous copolymer dispersion having a solids content of from 40% to 60% by weight, calculated on the dispersion, produced by the process of claim 1.

22. The fine-particle copolymer produced by separating the solids from the aqueous copolymer dispersion produced by the process of claim 1, having K-values of from 35 to 70 and a minimum film-forming temperature of $\leq 20°$ C.

23. The use of the fine-particle aqueous copolymer dispersion produced by the process of claim 1 for the manufacture of adhesives for wood, paper, plastics, films or leather, as binding agents for textiles or in paints, or for coating paper.

24. The process of claims 1 wherein said inert organic substance has a water solubility of from $10^{-2}$ to 10 g/l, a molecular weight of not more than 500, a boiling point of at least 170° C. at a pressure of one bar and a transfer constant of not more than 0.01.

25. The process of claim 24 wherein said inert organic substance is a member selected from the group consisting of (1) esters, partial esters and polyesters of monocarboxylic or polycarboxylic acids having from 1 to 20 carbon atoms with monohydric or polyhydric alcohols having from 1 to 20 carbon atoms, said esters optionally containing up to 3 hetero oxygens or substituents selected from the group consisting of epoxy and hydroxy, (2) esters of phosphoric acids with a phenol or monohydric alcohols having from 1 to 20 carbon atoms, said esters optionally containing up to 3 hetero oxygens or chlorosubstituents (3) alcohols having from 4 to 20 carbon atoms optionally containing up to 3 hetero oxygens, (4) ketones having from 5 to 20 carbon atoms, (5) ethers and acetals having from 4 to 20 atoms, (6) chlorohydrocarbons and fluorohydrocarbons having from 1 to 20 carbon atoms, (7) aromatic hydrocarbons having from 6 to 20 carbon atoms, (8) organic sulfonic acids amides, (9) esters of organic sulfonic acids having from 4 to 20 carbon atoms with monohydric alcohols having from 4 to 20 carbon atoms, and (10) sulfones.

* * * * *